US008161299B2

(12) United States Patent
Karkaria et al.

(10) Patent No.: US 8,161,299 B2
(45) Date of Patent: Apr. 17, 2012

(54) LOCATION BASED POLICY SYSTEM AND METHOD FOR CHANGING COMPUTING ENVIRONMENTS

(75) Inventors: Burges M. Karkaria, San Jose, CA (US); Vincent J. Zimmer, Federal Way, WA (US); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 11/961,854

(22) Filed: Dec. 20, 2007

(65) Prior Publication Data

US 2009/0164772 A1   Jun. 25, 2009

(51) Int. Cl.
*G06F 1/00* (2006.01)
(52) U.S. Cl. ..................................................... 713/300
(58) Field of Classification Search .................... 713/300
See application file for complete search history.

(56) References Cited

U.S. PATENT DOCUMENTS

| | | | |
|---|---|---|---|
| 6,940,407 B2 | 9/2005 | Miranda-Knapp et al. | |
| 6,957,364 B2 * | 10/2005 | Shimooka et al. | 714/25 |
| 7,007,183 B2 | 2/2006 | Rawson, III | |
| 7,133,663 B2 | 11/2006 | Fano et al. | |
| 7,185,211 B2 | 2/2007 | Loughran | |
| 7,221,939 B2 | 5/2007 | Ylitalo et al. | |
| 7,224,716 B2 | 5/2007 | Roman | |
| 7,327,245 B2 | 2/2008 | Krumm et al. | |
| 7,359,714 B2 | 4/2008 | Parupudi et al. | |
| 7,421,276 B2 | 9/2008 | Steer et al. | |
| 7,463,894 B2 | 12/2008 | Fano et al. | |
| 7,469,155 B2 | 12/2008 | Chu | |
| 7,483,944 B2 | 1/2009 | Parupudi et al. | |
| 2003/0009705 A1 | 1/2003 | Thelander et al. | |
| 2003/0135769 A1 | 7/2003 | Loughran | |
| 2003/0229768 A1 * | 12/2003 | Kawano et al. | 711/165 |
| 2004/0047299 A1 * | 3/2004 | Dorundo et al. | 370/254 |
| 2004/0111596 A1 | 6/2004 | Rawson et al. | |
| 2004/0158834 A1 * | 8/2004 | Ham et al. | 718/104 |
| 2005/0219120 A1 | 10/2005 | Chang | |
| 2005/0268121 A1 * | 12/2005 | Rothman et al. | 713/300 |
| 2006/0105745 A1 | 5/2006 | Frank et al. | |
| 2006/0288095 A1 | 12/2006 | Torok et al. | |
| 2007/0100480 A1 | 5/2007 | Sinclair et al. | |

(Continued)

FOREIGN PATENT DOCUMENTS

CN   1506794 A   6/2004

(Continued)

OTHER PUBLICATIONS

Office Action for Chinese Patent Application No. 2008101889578, mailed on Jun. 8, 2010, 6 pages of Office Action and 6 pages of English Translation.

(Continued)

*Primary Examiner* — Mohammed Rehman
(74) *Attorney, Agent, or Firm* — Barnes & Thornburg LLP

(57) ABSTRACT

A system and method for changing compute environments for a mobile platform device. The mobile platform includes a sensory and location determination engine coupled to a policy engine. The sensory and location determination engine determines a current location of the mobile platform device and the policy engine determines what applications to launch, what applications not to launch, and what core usage to invoke for the determined location of the mobile platform device.

25 Claims, 5 Drawing Sheets

U.S. PATENT DOCUMENTS

| | | | |
|---|---|---|---|
| 2007/0112772 A1* | 5/2007 | Morgan et al. | 707/9 |
| 2008/0200220 A1 | 8/2008 | Jackson | |
| 2009/0088138 A1 | 4/2009 | Jung et al. | |
| 2009/0098880 A1* | 4/2009 | Lindquist | 455/456.1 |
| 2009/0163226 A1 | 6/2009 | Karkaria et al. | |

FOREIGN PATENT DOCUMENTS

| | | |
|---|---|---|
| JP | 2005-535169 A | 11/2005 |
| WO | 2004/003703 A2 | 1/2004 |

OTHER PUBLICATIONS

European Search Report for European Patent Application No. 08171395.0, mailed on Oct. 6, 2009, 4 pages.

Pending U.S. Appl. No. 11/647,501, Title: "Heterogeneous Multi-processing", Filed Dec. 28, 2006.

Pending U.S. Appl. No. 11/731,433, Title: "Local and Remote Access Control of a Resource", Filed Mar. 30, 2007.

Extended European Search report for European Patent Application 08171395.0, mailed on Feb. 8, 2010, 10 pages.

Office action for U.S. Appl. No. 12/004,111, mailed on Sep. 16, 2010, 13 pages.

Office Action received for Japanese Patent Application No. 2008-315032, mailed on Jun. 28, 2011, 3 pages.

Office Action for Chinese Patent Application No. 200810183979.5 mailed on Jul. 14, 2010, 7 pages of Chinese office action and 12 pages of english translation.

Extended European Search Report for European Patent Application No. 08254044.4 mailed on Apr. 29, 2010, 7 pages.

Final Office action for U.S. Appl. No. 12/004,111 mailed on Feb. 2, 2011, 11 pages.

Advisory Action for U.S. Appl. No. 12/004,111 mailed on Apr. 18, 2011, 4 pages.

* cited by examiner

LOCATION BASED POLICY SYSTEM AND METHOD FOR CHANGING COMPUTING ENVIRONMENTS

This application is related to U.S. patent application Ser. No. 12/004,111 entitled, "Device, System, and Method of Power Saving Using Location Sensing Modules,"assigned to the assignee of the present invention and filed on Dec. 20, 2007.

BACKGROUND OF THE INVENTION

1. Field of the Invention

The present invention is generally related to ubiquitous computing. More particularly, the present invention is related to a system and method for changing computing environments based on location.

2. Description

People carry mobile devices, such as, but not limited to, laptops, ultra-mobile personal computers (UMPCs), and mobile internet devices (MIDs), everywhere in today's society. The mobile devices may be used in almost every location or environment, such as, for example, at the office, in an automobile or other form of transportation, at an airport, at home, and other establishments. In each of these environments, the mobile device may be used differently depending on the location of the mobile device.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to systems and methods for enabling a mobile platform, such as, for example, a laptop, ultra-mobile personal computer (UMPC), mobile internet device (MID), etc. to recognize its surroundings and change its computing environment according to its location. This is accomplished by incorporating a sensory & location determination engine (SLDE) and a policy engine (PE) on the mobile platform.

Figure 1:
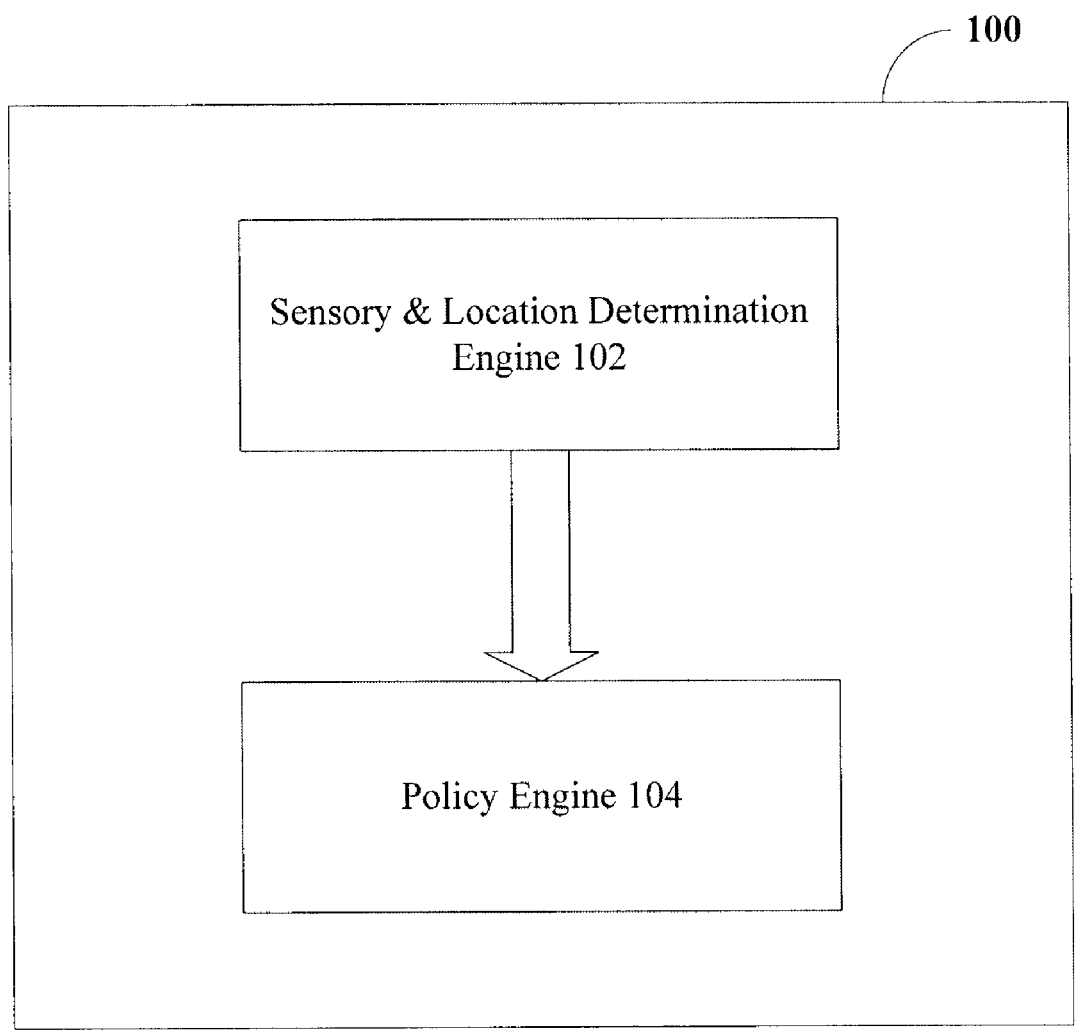
FIG. 1 is an exemplary diagram illustrating a mobile platform 100 having components that enable the mobile platform to recognize its surroundings and change its computing environment based on location according to embodiments of the present invention.

FIG. 1 is an exemplary diagram illustrating a mobile platform 100 having components that enable the mobile platform to recognize its surroundings and change its computing environment based on location according to embodiments of the present invention. Mobile platform 100 comprises, inter alia, a sensory & location determination engine (SLDE) 102 and a policy engine (PE) 104. SLDE 102 is coupled to PE 104.

SLDE 102 aggregates various sensor data, such as, but not limited to, audio, video, and GPS (Global Positioning System), and uses the sensor data to determine the location of the mobile device. In embodiments of the present invention, SLDE 102 may even operate in a shutdown mode to enable location determination of the mobile platform at all times. This may be accomplished using the known technique of Always On. Although the present invention utilizes the current sensors of the mobile platform to determine location, other sensors, currently employed or to be employed in the future on mobile platforms, may also be used to determine location.

Policy engine 104 determines what applications need to be launched, what applications need to be closed/put in standby mode/hibernated/etc., and what core usage needs to be invoked. Furthermore, policy engine 104 utilizes dynamic virtualization to partition applications used for a current location from applications used in other locations.

Throughout the specification, reference is made to a mobile platform and a mobile device. A mobile device is a device that incorporates a mobile platform. Such devices may include a laptop computer, a UMPC, a MID, etc.

As previously indicated, embodiments of the present invention enable a mobile device to recognize its surroundings and change its computing environment based on its location/environment. Mobile devices are carried everywhere in today's society, but the usage for the mobile device may vary depending on the location/environment of the mobile device. For example, when the mobile device is in an office setting, it may be used for emails, office applications, collaboration with colleagues, such as, for example, instant messaging (IM), VoIP (Voice over Internet Protocol) using an office call list, etc. When the mobile device is in an automobile setting, it may be used to stream music and video, provide driving instructions using a voice activated Global Positioning System (GPS), receive and send phone calls using, for example, VoIP via Bluetooth using a personal call list, etc. When the mobile device is in a living room of the user's home, it may be used for, but is not limited to, personal media file playback and VoIP using a personal call list. When the mobile device is in a study/office of the user's home, it may be used in a similar manner as the user's work office mode with the addition of personal banking, tax applications, and other personal user applications. Thus, depending on the location/environment of the mobile device, different usage models may be employed.

Figure 2:
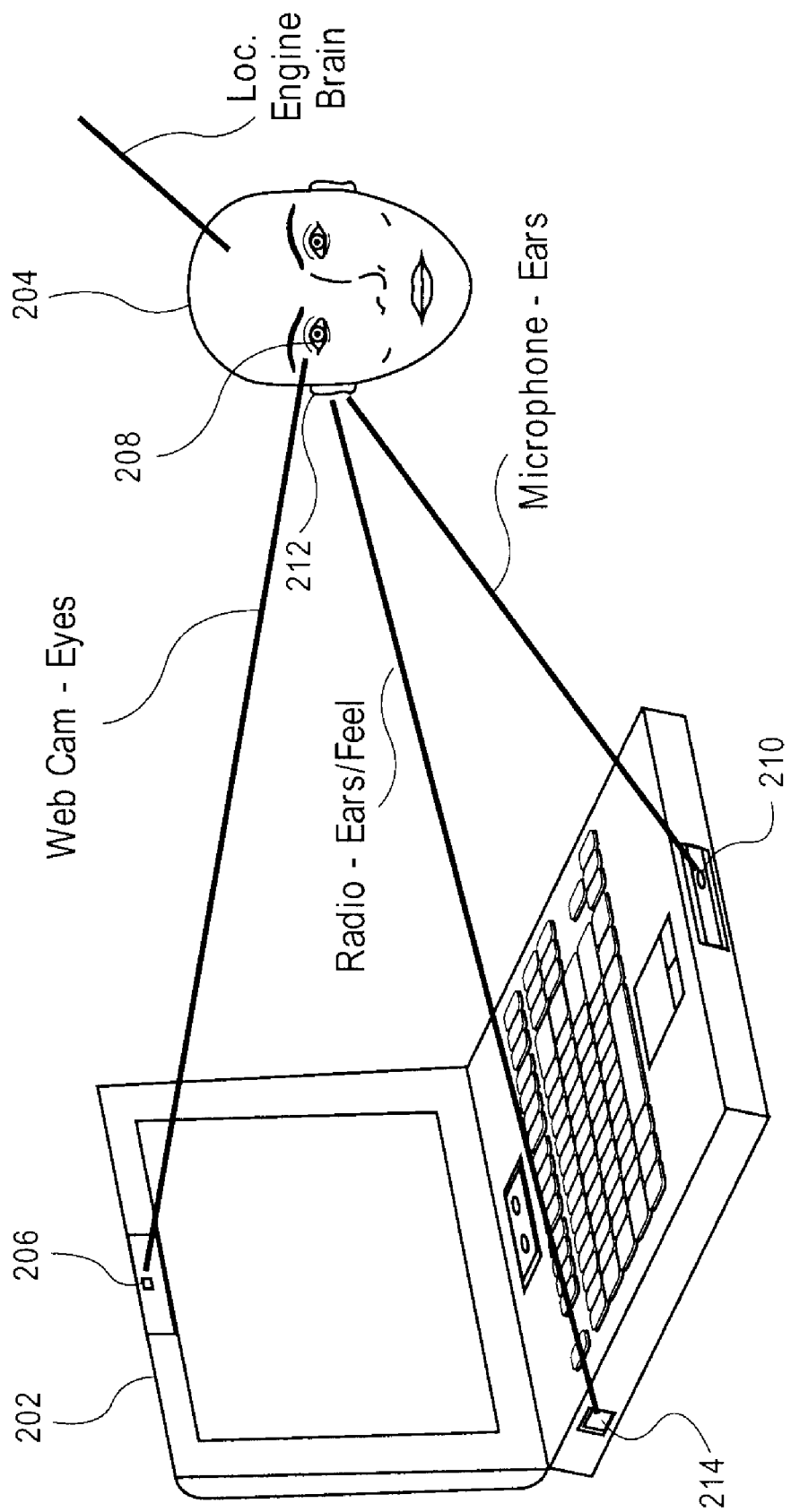
FIG. 2 is an exemplary diagram illustrating sensory attributes of a mobile device for providing human-like sensory characteristics that aid in determining the location/environment of the mobile device according to an embodiment of the present invention.

As previously indicated, sensory & location determination engine (SLDE) 102 derives the location of the mobile device using sensor data from the mobile device. SLDE 102 captures various sensor inputs and determines the location of the mobile device. FIG. 2 is an exemplary diagram 200 illustrating sensory attributes of a mobile device for providing human-like sensory characteristics that aid in determining the location/environment of the mobile device according to an embodiment of the present invention. Diagram 200 comprises a laptop mobile device 202 and a human figure head 204. Laptop 202 is used as an example of the types of mobile devices that may be used. Embodiments of the present invention are not limited to laptop mobile devices, and in fact, may use any mobile platform device that provides one or more sensory inputs to aid in determining the location of the mobile device.

Sensory attributes of mobile device 202 are contrasted with human sensory attributes of human figure head 204. The sense of sight (vision) is provided by mobile device 202 using a web-cam 206. Web-cam 206 may be used to obtain video input. Thus, web-cam 206 acts as the eyes 208 of human figure head 204 to provide sight to mobile device 202. The sense of hearing is provided by mobile device 202 using microphone 210. Microphone 210 may be used to receive audio input. Thus, microphone 210 acts as the ears 212 of human figure head 204 to provide the ability of hearing to mobile device 202. The senses of hearing and feeling are provided by mobile device 202 using radio 214. Radio 214 may include one or more of a WiFi radio, a Bluetooth radio, and a WiMAX radio. Radio 214 may be used to receive input signals that enable mobile device 202 to communicate with a network, such as, for example, the Internet or Intranet, wirelessly.

The processing power of mobile device 202 is compared with the human brain. The sensory inputs, as discussed above, are fed into the processor where they are processed to obtain the exact location of mobile device 202 in a manner similar to how a human brain might determine the exact location of the mobile platform utilizing the human senses as data input.

Figure 3:
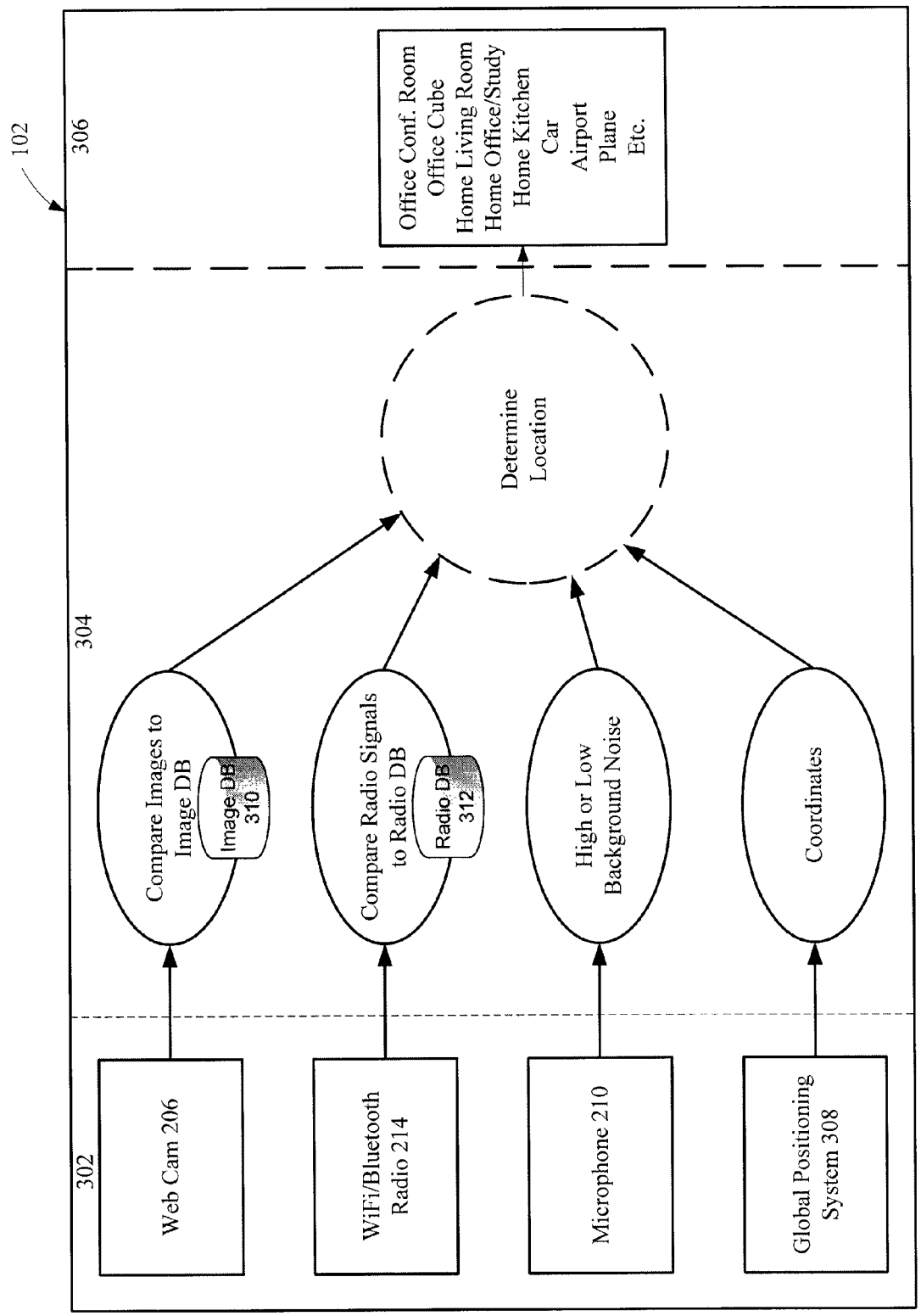
FIG. 3 is an exemplary diagram illustrating a sensory & location determination engine according to an embodiment of the present invention.

Sensory & Location Determination Engine (SLDE) 102 aggregates the various sensory inputs and processes them to determine the location of mobile platform 100. FIG. 3 is an exemplary diagram illustrating the sensory & location determination engine (SLDE) 102 according to an embodiment of the present invention. SLDE 102 comprises an input section 302, a processing section 304, and an output section 306. Input section 302 is coupled to processing section 304. Processing section 304 is coupled to output section 306.

Input section 302 includes the sensory input data extracted by mobile platform 100 using the sensory components of mobile platform 100 discussed above with reference to mobile device 202 in FIG. 2. The input data includes video data from web cam 206, WiFi radio/Bluetooth radio data from WiFi radio/Bluetooth radio 214, audio data from microphone 210, and GPS data from a built-in GPS 308 of mobile platform 100. Although not shown, other inputs may also be used to aid in the determination of location. Such inputs may include, but are not limited to, temperature and orientation. Temperature may be obtained using thermal diodes from the mobile device and orientation may be obtained using accelerometers from the mobile device.

Processing section 304 aggregates all of the input data and determines the location of the mobile device. As shown in FIG. 3, processing section 304 receives video input from web cam 206 and compares the video input to data stored in a web cam database 310 to determine the location. For example, if mobile device 100 is in a car, the mobile platform may recognize car components captured via web cam 206, such as, for example, a dashboard, car seats, steering wheel, etc by comparing the captured video inputs with stored video data representative of generic objects found in a car or actual objects found in the user's car.

Processing section 304 receives radio input from a radio, such as, for example, a WiFi radio, a WiMax radio, a Bluetooth radio, etc., and compares the radio input signal with radio signals in a radio database 312 to determine the location of the incoming radio signal. For example, mobile platform may discern whether the radio input signal is from the user's office network, home network, car network, or some other network to aid in determining the location of the mobile device. For example, if the received radio signal matches a radio signal stored in radio database 312 that is representative of the user's office network, then the mobile device may be located at the user's office.

Processing section 304 receives audio input via microphone 210, which is processed using an audio card (not shown). Processing section 304 may check to see if the audio is indicative of high or low background noise. For example, if the background noise is high, the mobile device may be located in an airport and if the background noise is low, the mobile device may be located in a home study/office.

In instances where mobile platform 100 includes a built in GPS, processing section 304 may also receive GPS coordinate inputs. The GPS coordinates may be used to determine the location of the mobile device in a manner well known to those skilled in the relevant art(s). Also, if the coordinates are rapidly changing, the GPS coordinates may indicate that the location is a moving automobile, plane, train, or some other form of transportation. If the coordinates are changing, but at a slower pace, SLDE 102 may determine that the user is carrying the mobile device as the user moves (i.e., walks, runs, etc.).

Processing section 304 may use one or more of the inputs to determine the location of the mobile device. For example, processing section 304 may use input from web cam 206, radio 214, and GPS 308 to determine that the mobile device is located in a moving automobile. In another example, processing section 304 may use radio input signals to determine that the radio signal is a home radio signal and then use web cam 206 to determine that the mobile device is located in the living room of the user's home. In yet another example, processing section 304 may use input from web cam 206 to determine that the mobile device is located in the kitchen of the home by comparing video of a refrigerator, microwave, oven, etc. to generic or actual user entries in the web cam database 310 resembling kitchen appliances.

Output section 306 outputs the location of the mobile platform. Some of the locations that may be determined include, but are not limited to, an office conference room, an office cube, a home living room, a home study/office, a home kitchen, an airport, a plane, and an automobile, just to name a few.

As previously indicated, based on the location of the mobile platform, policy engine 104 determines what applications need to be launched, what applications need to be closed/put in standby/hibernated/etc., and what core usage needs to be invoked. For example, if one has moved from the office to the car, applications to be activated may include, but are not limited to, a voice activated GPS, an audio streaming media player, and VoIP using Bluetooth. Applications to be closed/put in standby/hibernated/etc. may include MS Outlook, MS Office, and other applications used only in an office setting. In one embodiment, when a mobile device is being operated in an office environment, all cores may be invoked, but when the mobile device is moved from an office setting to a car, for example, a single core may be invoked because the charging capabilities of the mobile device may not exist in the car.

As previously indicated, policy engine 104 employs dynamic virtualization to partition applications that are not currently in use to a low power state virtual partition, and to move applications that are currently needed to a virtual active partition. Policy engine 104 also provides core management to optimally allocate core usage for the virtual partitions. This ensures optimal power usage based on core allocation and the environment in which the mobile device is being operated. For example, if the mobile device is in an environment in which it cannot be connected to a power outlet, such as, for example, an automobile, the mobile device may need to be operated in a low power state to conserve the available battery power. This may include shutting down cores to maximize the available battery power of the mobile device. In another example, if the mobile device is in a location in which electrical power outlets are known to be readily available, such as, for example, in the office or in the home, all cores may be activated. Thus, with embodiments of the present invention, the environment/location and virtual partitioning work together to determine optimal core usage for the mobile device.

Figure 4:
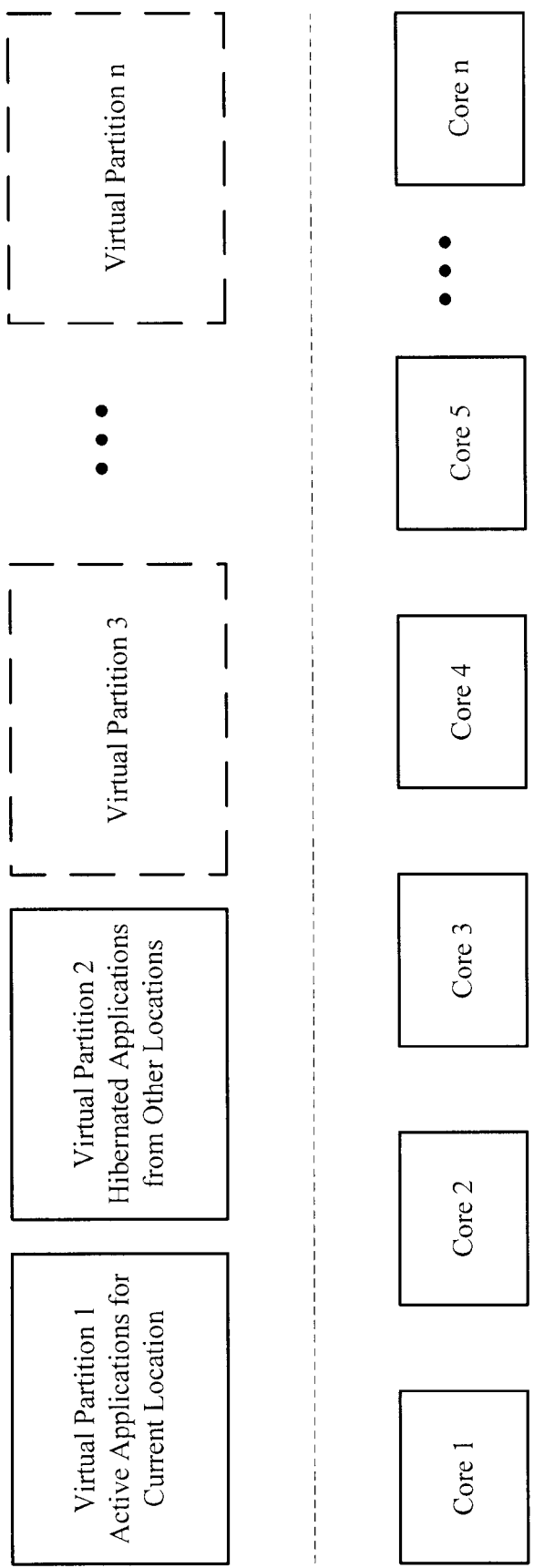
FIG. 4 is an exemplary diagram illustrating dynamic virtualization for active location according to an embodiment of the present invention.

FIG. 4 is an exemplary diagram 400 illustrating dynamic virtualization for core management according to an embodiment of the present invention. Diagram 400 shows a plurality of virtual partitions (Virtual Partition 1, Virtual Partition 2 . . . Virtual Partition n) and a plurality of cores (Core 1, Core 2 . . . Core n). Virtual Partition 1 may be designated as an active virtual partition. The active virtual partition (Virtual Partition 1) comprises active applications for the current location/environment. For example, if the device is in a car environment, active applications in Virtual Partition 1 may include, but are not limited to, media streaming applications for playing music and/or movies in the car, a voice activated GPS system, and a VoIP application for Bluetooth operations. If the device is in a living room environment, active applications in Virtual Partition 1 may include, but are not limited to, media streaming applications for playing music, movies, videos, and pictures, a VoIP application for receiving telephone calls, and an Internet program for surfing Web content. If the device is in an office environment, such as for example, a work office environment, active applications in Virtual Partition 1 may include, but are not limited to, office applications, an IM application, a VoIP application, an Internet application for interfacing with the Intranet and the Internet, etc.

Virtual Partition 2 may be designated as a hibernate virtual partition for applications in which an existing state needs to be maintained. In one embodiment, the hibernate virtual partition (Virtual Partition 2) may include all applications that are not being utilized in the active virtual partition (Virtual Partition 1). In an alternative embodiment, there may be more than two virtual partitions (Virtual Partition 1 . . . . Virtual Partition n, shown in phantom). For example, there may be an active partition for active applications used in the current environment, a hibernate partition for applications that need to retain an existing state of last use, but are not currently being used in the current environment, and a closed virtual partition for applications that are not being used in the current environment and were closed or need to be closed without retaining an existing state. Other virtual partitions may also be employed, such as, but not limited to, a standby virtual partition.

In yet another embodiment of the present invention, virtual partitions may be implemented based on location. For example, Virtual Partition 1 may include all applications used in a car, Virtual Partition 2 may include all applications used in a work office, Virtual Partition 3 may include all applications used in a home office, Virtual Partition 4 may include all applications used in a living room, Virtual Partition 5 may include all applications used in a kitchen, etc. In this embodiment, the active virtual partition is the virtual partition in which the mobile device is located.

In one embodiment, certain cores may be dedicated to certain virtual partitions. For example, in one embodiment, a majority of cores may be dedicated to the active virtual partition while a minority of cores may be dedicated to the hibernate virtual partition and/or any remaining partitions. In yet another embodiment, cores may be allocated based solely on the environment. For example, if the environment is an office environment, all cores may be allocated for the active partition with no core allocation for the hibernate partition or all but one core may be allocated for the active partition with one core allocated to the hibernate partition. In another example, if the environment is an automobile, maybe one or two cores are allocated for the active partition and one or two cores are allocated for the hibernate partition. In yet another embodiment, the policy may be no more cores than can be sustained, no less cores than what is necessary. For example, maybe it takes a user of a mobile device two (2) hours to get to work and the mobile device can maintain two cores for two hours using battery power, but only one core is needed to run the active applications, then only one core will be allocated for the active virtual partition. Thus, core management is based on many factors, such as, but not limited to, location/environment, virtual partition usage, length of time to be used, etc.

Figure 5:
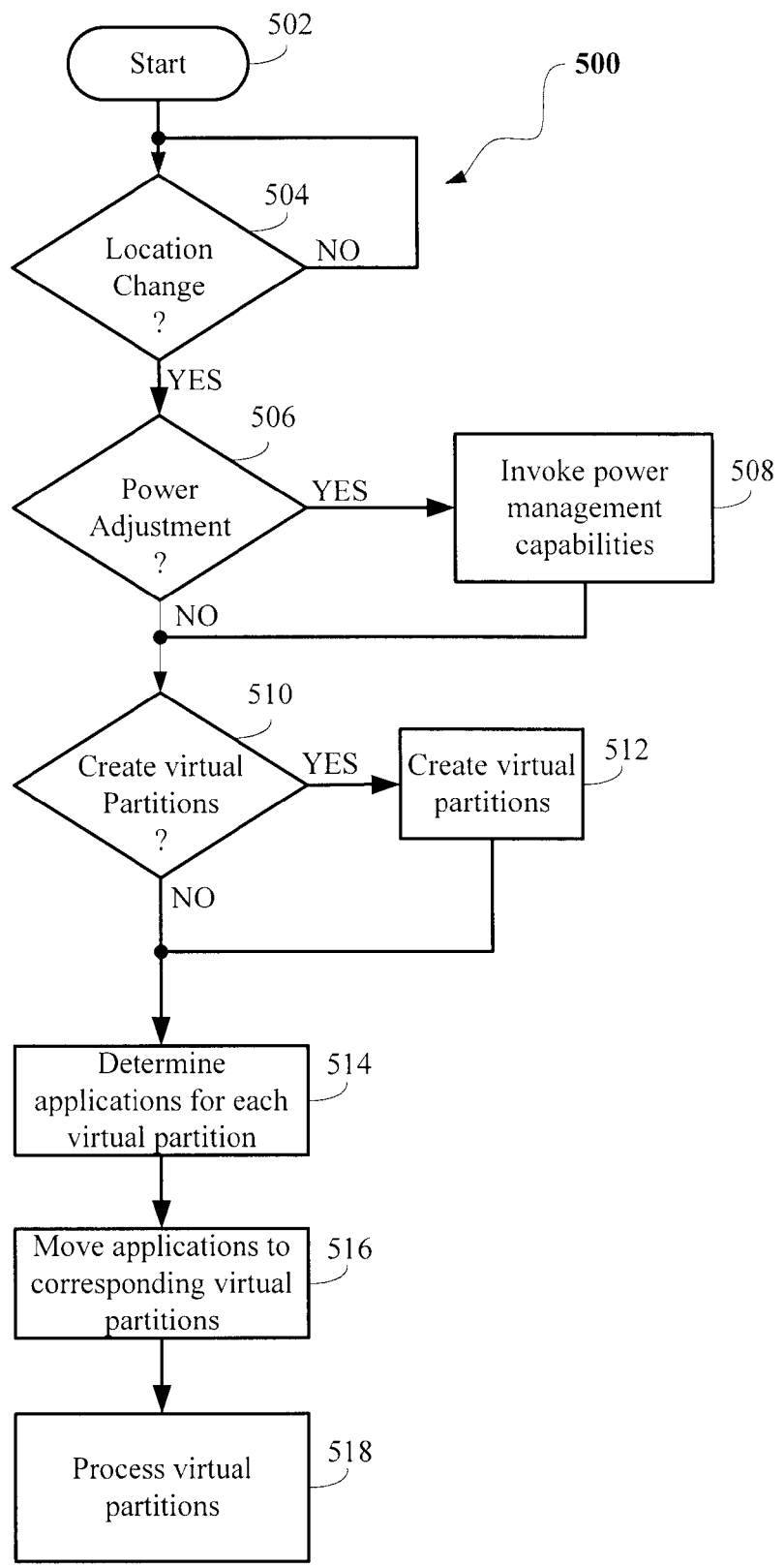
FIG. 5 is an exemplary flow diagram illustrating a method for policy engine flow according to an embodiment of the present invention.

FIG. 5 is an exemplary flow diagram 500 describing a method for policy engine management operations according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to decision block 504.

In decision block 504, it is determined whether a location change has been detected. As previously indicated, a location change is determined using SLDE 102 by processing one or more sensor inputs. If a location change has not been detected, the process remains at decision block 504. If a location change has been detected, the process proceeds to decision block 506.

In decision block 506, it is determined whether the current location needs a power adjustment (i.e., core usage adjustment). If the current location needs a power adjustment, the process proceeds to block 508.

In block 508, policy engine 102 may allocate core usage based on location/environment, the number of virtual partitions, the types of virtual partitions being used, the length of time to be used, etc. For example, if the current location is a car and the previous location was the office, then a lower power state is needed for the car environment than was used for the office environment since charging capabilities may not exist in the car and fewer applications are running in the car than were running in the office. The process then proceeds to decision block 510.

Returning to decision block 506, if it is determined that the current location does not need a power adjustment, then the process proceeds to decision block 510. For example, if the current location is a car and the previous location was the living room, and the power state for the car is approximately equivalent to the power state for the living room, then no power adjustment may be necessary.

In decision block 510, it is determined whether virtual partitions need to be created. If virtual partitions need to be created, then the process proceeds to block 512.

In block 512, virtual partitions are created (if they do not already exist). In one embodiment, a virtual partition is created for the current location and a virtual partition is created for the hibernate locations. Other embodiments of the present invention are not limited to two virtual partitions. As previously indicated, other virtual partitions may also be created. For example, in one embodiment, a closed virtual partition may also be created for applications that no longer need to retain an existing state. After the virtual partitions are created, the process proceeds to block 514.

Returning to decision block 510, if it is determined that virtual partitions do not need to be created, the process proceeds to block 514.

In block 514, it is determined which applications need to be placed in the virtual partitions. For example, it is determined which applications need to be placed in the active virtual partition and which applications need to be placed in the hibernate virtual partition for all of the remaining locations. In embodiments where more than two (2) virtual partitions are used, a determination may be made as to what applications belong in each of the virtual partitions. Also, in embodiments of the invention, many applications may transcend location/environment boundaries. For example, a VoIP application may be used in the office environment, in the car environment, and in the home environment, and therefore, would be placed in the active partition for each of these locations/environments. There also may be different versions of an application for different locations/environments. In this instance, the appropriate version would be placed in the appropriate virtual partition. The process then proceeds to block 516.

In block 516, all applications are moved to their designated virtual partitions. The process then proceeds to block 518.

In block 518, applications in the various virtual partitions are processed according to the virtual partition in which they were placed. For example, applications moved to the hibernate virtual partition are hibernated and applications moved to the active partition are launched. If additional virtual partitions are used and have applications placed in them, then the applications are processed accordingly. For example, if a closed virtual partition is created, applications placed in that virtual partition that need to be closed are closed. The process then proceeds back to decision block 504 to determine whether a location/environment change has occurred.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a plurality of processor cores, a storage medium readable by the processor cores (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A system for changing computing environments comprising:
a sensory and location determination engine to determine a current location of a computing device; and
a policy engine coupled to the sensory and location determination engine, the policy engine to determine what applications to launch, what applications not to launch, and what core usage to invoke for the determined location of the computing device,
wherein the policy engine further (i) to determine which applications to move to an active virtual partition and which applications to move to a low power virtual partition based on the determined location of the computing device, (ii) to allocate a first number of processor cores of a plurality of processor cores of the system to the active virtual partition based on the determined location, and (iii) to allocate a second number of processor cores of the plurality of processor cores to the low power virtual partition based on the determined location.

2. The system of claim 1, wherein the sensory and location determination engine to operate in shutdown mode to enable location determination at all times.

3. The system of claim 1, wherein the sensory and location determination engine to aggregate sensor data from the computing device and use the sensor data to determine the location of the computing device.

4. The system of claim 3, wherein the sensor data from the computing device comprises one or more of video data, audio data, radio data, and Global Positioning System (GPS) data, wherein one or more sensor data inputs are used to determine the location of the computing device.

5. The system of claim 4, wherein the video data comprises video data taken by a web cam of the computing device of a current location of the computing device, wherein the video data received is compared to an image database to determine the location of the computing device.

6. The system of claim 4, wherein the radio data comprises radio signal data from one or more of a WiFi radio, a Bluetooth radio, a WiMAX radio, or any other radio that enables the computing device to communicate with a network, wherein the radio signal data is compared to a radio database to determine the location of the received radio signal data.

7. The system of claim 4, wherein the audio data to determine high or low background noise to aid in the determination of the location of the computing device.

8. The system of claim 4, wherein the GPS data to provide GPS coordinates to provide the location of the computing device, wherein when the GPS coordinates received are rapidly changing, the location is determined to be in a moving vehicle.

9. The system of claim 1, wherein the policy engine to use dynamic virtualization to partition applications to be used in the current location from applications to be used in other locations.

10. The system of claim 9, wherein applications to be used at the current location of the computing device are placed in the active virtual partition and applications to be used in the other locations are placed in at least one of the low power partition or one or more other virtual partitions.

11. The system of claim 10, wherein the at least one of the low power partition or the one or more other virtual partitions comprise at least one hibernate virtual partition for applications that need to retain an existing state of last use.

12. The system of claim 10, wherein the at least one of the low power partition or the one or more other virtual partitions comprise at least one closed virtual partition for applications that do not need to retain an existing state of last use.

13. The system of claim 10, wherein the at least one of the low power partition or the one or more other virtual partitions comprise at least one standby virtual partition for applications that need to be put on standby.

14. The system of claim 10, wherein the at least one of the low power partition or the one or more other virtual partitions comprise a virtual partition for each location in which the computing device is to be used.

15. The system of claim 10, wherein the first number of cores to be invoked by the policy engine is based on one or more of the location of the computing device, the number of virtual partitions used, the type of virtual partitions used, and the length of time the computing device will be used in the current location.

16. The system of claim 1, wherein the computing device is a mobile platform device.

17. A method for changing a computing environment comprising:
determining whether a change in location of a computing device has been detected, wherein if a change in location of a computing device has been detected,
determining whether virtual partitions need to be created, wherein if the virtual partitions need to be created, creating at least one of an active virtual partition and a low power state virtual partition to be used in the current location;
determining whether a current location needs a power adjustment, wherein if the current location needs the power adjustment, (i) allocating a first number of processor cores of a plurality of processor cores to the active virtual partition based on the location of the computing device and (ii) allocating a second number of processor cores of the plurality of srocessor cores to the low power virtual partition based on the location of the computing device;
determining what applications need to be placed in each of the active virtual partition and the low power state virtual partition based on the location of the computing device;
moving the applications to their designated virtual partition based on the determination of what applications need to be placed in each of the active and low power state virtual partitions; and
processing each of the active and low power state virtual partitions accordingly.

18. The method of claim 17, determining whether a change in location of a computing device has been detected comprises processing one or more sensor inputs of the computing device to determine the location of the computing device, wherein the one or more sensor inputs include a video input from a web cam that is compared to an image database, an audio input that is processed to determine whether it represents high or low background noise, a radio input from one of a WiFi radio, a Bluetooth radio, or a WiMAX radio that is compared to a database of radio signals to determine the location where the radio signal is used, and a Global Positioning System (GPS) input in which the GPS coordinates are used to determine location.

19. The method of claim 17, wherein at least one virtual partition comprises the active virtual partition for executing applications to be used in the current location.

20. The method of claim 17, wherein at least one virtual partition comprises a hibernate virtual partition for hibernating applications that are not to be used in the current location, but need to retain an existing state of last use for operation in other locations.

21. The method of claim 17, wherein processing each of the active and low power state virtual partitions accordingly comprises launching the applications to be used in the active virtual partition for the current location and hibernating or closing the applications that are used in the low power state virtual partition.

22. An article comprising: a storage medium having a plurality of machine accessible instructions, wherein when the instructions are executed by a processor, the instructions provide for determining whether a change in location of a computing device has been detected, wherein if a change in location of a computing device has been detected,
determining whether virtual partitions need to be created, wherein if the virtual partitions need to be created, creating at least one of an active virtual partition and a low power state virtual partition to be used in the current location;

determining whether a current location needs a power adjustment, wherein if the current location needs the power adjustment, (i) allocating a first number of processor cores of a plurality of processor cores to the active virtual partition based on the location of the computing device and (ii) allocating a second number of processor cores of the plurality of processor cores to the low power virtual partition based on the location of the computing device;

determining what applications need to be placed in each of the active virtual partition and the low power state virtual partition based on the location of the computing device;

moving the applications to their designated virtual partition based on the determining what applications need to be placed in each of the active and low power state virtual partitions; and processing each of the active and low power state virtual partitions accordingly.

23. The article of claim 22, wherein instructions for determining whether a change in location of a computing device has been detected comprises instructions for processing one or more sensor inputs of the computing device to determine the location of the computing device, wherein the one or more sensor inputs include a video input from a web cam that is compared to an image database, an audio input that is processed to determine whether it represents high or low background noise, a radio input from one of a WiFi radio, a Bluetooth radio, or a WiMAX radio that is compared to a database of radio signals to determine the location where the radio signal is used, and a Global Positioning System (GPS) input in which the GPS coordinates are used to determine location.

24. The article of claim 22, wherein instructions for processing each of the active and low power state virtual partitions accordingly comprises instructions for launching the applications to be used in the active virtual partition for the current location and hibernating or closing the applications that are used in the low power state virtual partition.

25. The article of claim 22, wherein at least one virtual partition comprises the active virtual partition for executing applications to be used in the current location and at least one virtual partition comprises a hibernate virtual partition for hibernating applications that are not to be used in the current location, but need to retain an existing state of last use for operation in other locations.

* * * * *